United States Patent [19]

Sakata et al.

[11] Patent Number: 4,567,660
[45] Date of Patent: Feb. 4, 1986

[54] CLAMP DEVICE IN MEASURING INSTRUMENT

[75] Inventors: Hideo Sakata; Eiichi Tsunoda, both of Kawasaki, Japan

[73] Assignee: Mitutoyo Mfg. Co., Ltd., Tokyo, Japan

[21] Appl. No.: 657,720

[22] Filed: Oct. 4, 1984

[30] Foreign Application Priority Data

Oct. 25, 1983 [JP] Japan .................. 58-165858[U]

[51] Int. Cl.⁴ .............................................. E05C 17/02
[52] U.S. Cl. ..................................... 33/1 M; 292/305
[58] Field of Search ............ 33/174 R, 169 R, 174 L, 33/1 M, 551, 556, 572; 248/225.31, 245, 316.1, 316.2, 218.4, 219.3; 292/305, 306

[56] References Cited

U.S. PATENT DOCUMENTS

| 457,615 | 8/1891 | Marcell | 292/305 |
| 476,037 | 5/1892 | Colton | 292/305 |
| 1,954,739 | 4/1934 | Lyons | 292/305 |
| 2,419,752 | 4/1947 | Zumbuhl | 33/158 |
| 2,621,412 | 12/1952 | Slusher, Jr. | 33/158 |

Primary Examiner—Willis Little
Attorney, Agent, or Firm—Flynn, Thiel, Boutell & Tanis

[57] ABSTRACT

This disclosure depicts a clamp device in a measuring instrument wherein a slider having a detecting portion is clamped to a guide member, comprising: a holder provided on the slider and penetrated therethrough with the guide member; a movable block received in the holder and having a through-hole, through which the guide member extends; a screw member threadably coupled into the movable block; and a rotation locking mechanism for locking the movable block. Rotation of the screw member causes the forward end face thereof to contact the guide member, so that the slider can be clamped.

3 Claims, 4 Drawing Figures

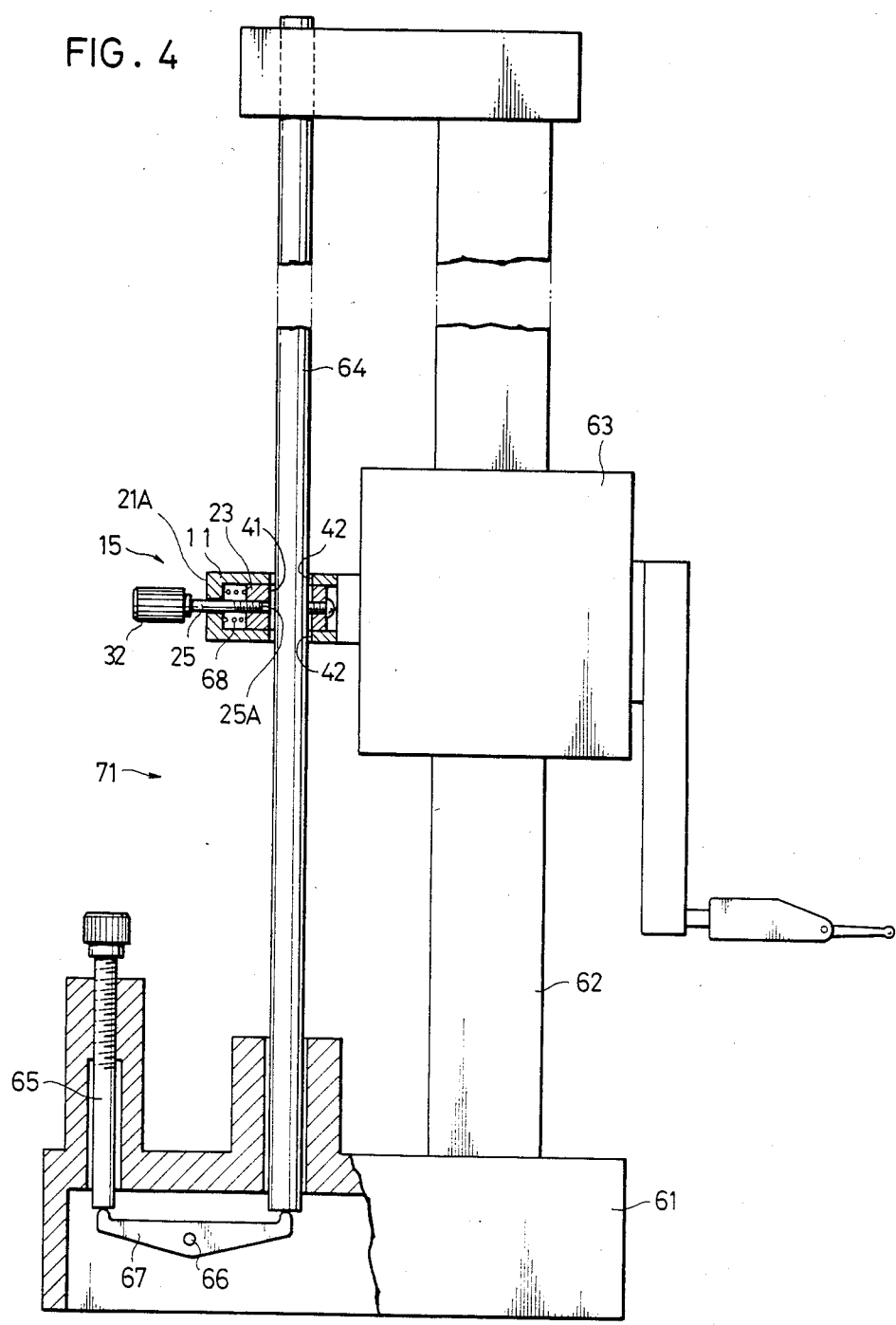

CLAMP DEVICE IN MEASURING INSTRUMENT

BACKGROUND OF THE INVENTION

1. Field of the Invention

This invention relates to a clamp device in a measuring instrument, for suitably clamping a slider of the measuring instrument, and more particularly to improvements in influence of a deflection given to the measuring instrument by a clamping force.

2. Description of the Prior Art

With various measuring instruments including a coordinate measuring instrument and a height gauge, there are many cases where a slider holding a detecting portion or a work to be measured is slidably supported on rails, supports or the like, which are formed separately of the guide member, so as to secure smooth controllability, a low measuring pressure and so on. Furthermore, there is a case where a slider is integrally fastened and fixed to a guide member in use for the automatic measuring. In that case, it becomes necessary to provide a clamp device for suitably clamping the slider to the guide member. Particularly, with the coordinate measuring instrument, a height gauge and the like, there are many cases where a clamp device is utilized as a part of a fine adjusting device for finely moving this guide member relative to the rails, supports or the like after the slider is clamped to the guide member.

Now, with the conventional clamp devices, it has been a common practice to use a construction, wherein, for example, a screw member or the like is pressed against a side surface of the guide member to clamp the slider to the guide member. Because of this, the guide member is deflected under the clamping force, and this deflection causes a delicate deformation to the entire construction of the measuring instrument, with the result that an error is caused to occur in the detecting portion and the like of the slider. Thus, there may be cases where impermissible errors are caused to occur when measurements with high accuracy of micron meter order are conducted.

SUMMARY OF THE INVENTION

The present invention has as its object the provision of a clamp device in a measuring instrument, capable of avoiding causing a deflection to a guide member even in clamping and of measuring with high accuracy.

To this end, the present invention contemplates that a holder penetrated therethrough with a guide member is affixed to a slider, a movable block is held by the holder in a manner to be movable in a direction of intersecting the longitudinal direction of the guide member, the movable block is formed with a through-hole, through which the guide member extends, further, a screw member is inserted through and held by the movable block in a menner to be movable in the moving direction of the movable block, the forward end of the screw member is protruded into the through-hole to be able to come in contact with the guide member in the through-hole, a rotation locking mechanism for locking the rotation of the movable block against the holder during rotation of the screw member, and, rotation of the screw member during clamping causes the forward end of the screw member and a portion of the movable block opposed to the forward end of the screw member in the through-hole to clamp and fasten the guide member from opposite sides thereof, so that a clamping force to clamp the slider to the guide member can be acted on without deflecting the guide member.

BRIEF DESCRIPTION OF THE DRAWINGS

FIG. 4 is a partially cutaway side view showing the general arrangement of an embodiment wherein the present invention is applied to a height gauge.

DETAILED DESCRIPTION OF THE PREFERRED EMBODIMENT

Description will hereunder be given of embodiments of the present invention with reference to the drawings.

Figure 1:
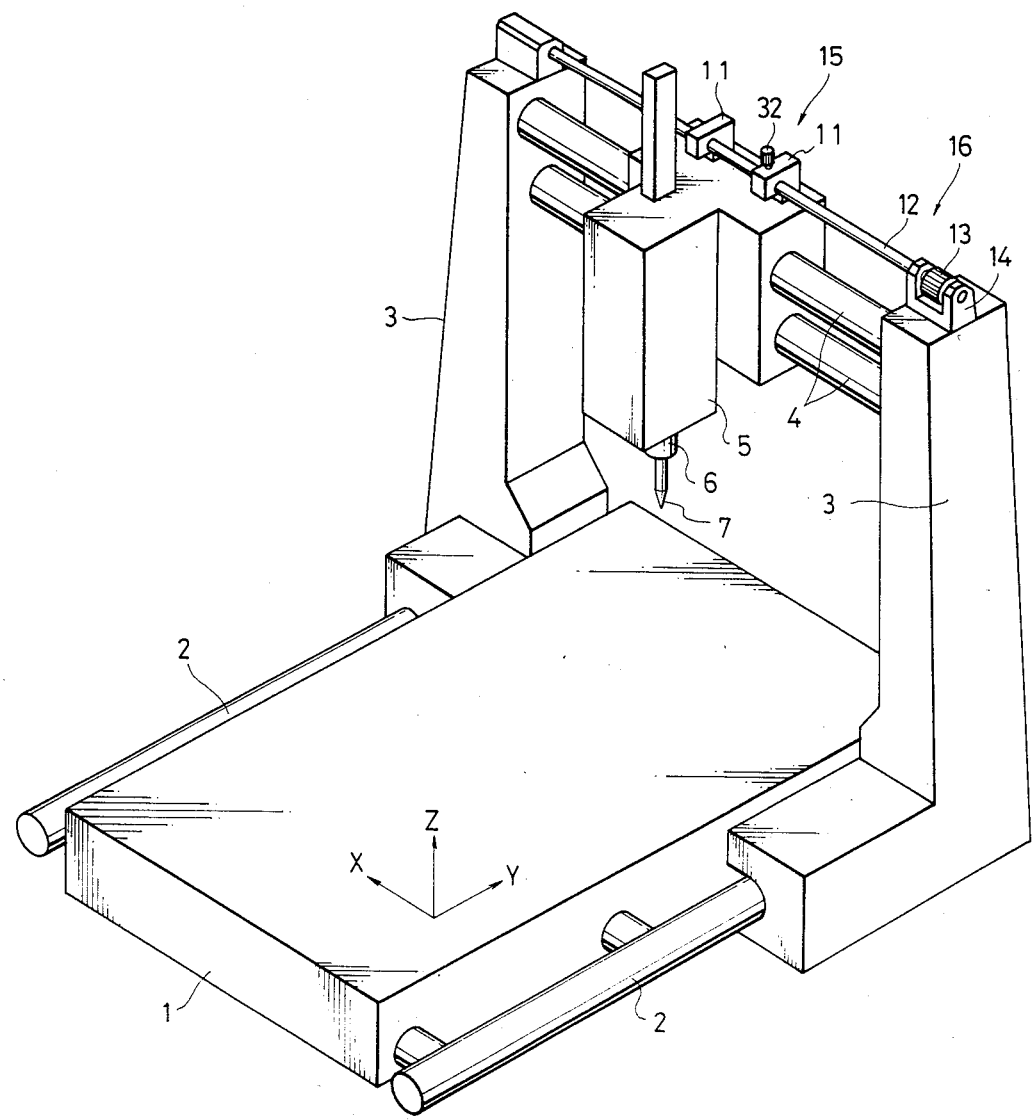
FIG. 1 is a perspective view showing the general arrangement of an embodiment wherein the clamp device in a measuring instrument according to the present invention is applied to a coordinate measuring instrument.

FIG. 1 shows an embodiment in which the clamp device in a measuring instrument according to the present invention is applied to a coordinate measuring instrument. Referring to the drawing, Y-axis rails 2 are provided at opposite sides of a measuring table 1. A Y-axis slider 3 is provided on each Y-axis rail 2 in a manner to be movable in a direction of Y-axis. Two Y-axis sliders 3 are connected to each other through X-axis rails 4. Supported by these X-axis rails 4 is an X-axis slider 5 in a manner to be movable in a direction of the X-axis, supported by this X-axis slider 5 is a Z-axis slider 6 in a manner to be movable in a direction of the Z-axis, and a touch signal probe 7 as being a detecting portion is secured to the bottom end portion of the Z-axis slider 6, whereby the touch signal probe 7 is supported in a manner to be tridimensionally movable relative to the X, Y and Z-axes intersecting one another, respectively.

The X-axis slider 5 is affixed thereto with a plurality of holders 11. A round rod-shaped guide member 12 penetrates through and is engaged with the holders 11. The guide member 12 is disposed in parallel to the X-axis rails 4 and opposite ends thereof are secured to the top portions of the X-axis sliders 3, respectively. As the X-axis slider 5 is moved along the X-axis rails 4, the holders 11 are movably engaged with the guide member 12.

Furthermore, the guide member 12 is mounted to the both Y-axis slider 3 in a manner to be movable within a predetermined range in the longitudinal direction thereof (the X-axis direction), a nut 13 for fine adjustment is threadably coupled onto one end portion of the guide member 12, and this nut 13 is positioned by a bracket 14 formed into a substantially U-shape and holding the guide member 12 extending therethrough in a manner to be unmovable in the aforesaid longitudinal direction and rotatable about the axis thereof. This bracket 14 is secured to the top portion of one of the Y-axis sliders 3, rotation of the nut 13 causes the guide member 12 threadably coupled into this nut 13 to move in the longitudinal direction thereof, and a clamp device 15 according to the present invention is provided on one of the holders 11 engaged with the guide member 12. Rotation of the nut 13 in the state, where the X-axis slider 5 is clamped (fixed) to the guide member 12 by the clamp device 15, causes the X-axis slider 5 to finely move relative to the X-axis rails 4, so that the fine adjustment can be carried out. Here, the guide member 12, the nut 13, the bracket 14 and the clamp device 15 constitute a fine adjustment mechanism 16.

Figure 2:
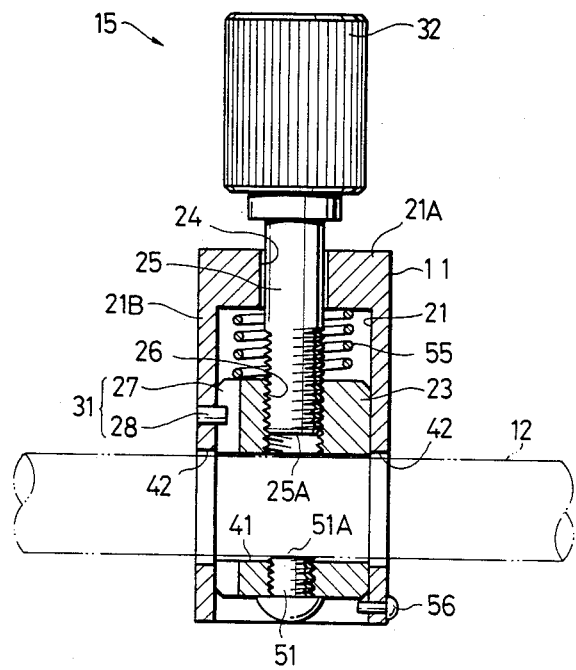
FIG. 2 is an enlarged sectional view showing the construction of the essential portions of the above embodiment.
Figure 3:
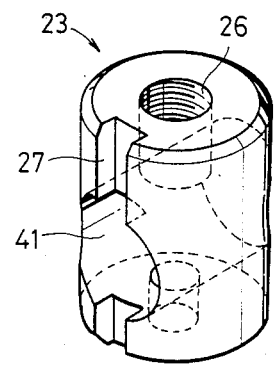
FIG. 3 is an enlarged perspective view showing the arrangement of the movable block in the above embodiment.

FIG. 2 shows the arrangement of the clamp device 15. Referring to the drawing, a vacant space 21 is formed in the holder 11. The space 21 is of a columnar shape, the center axis of the columnar shape is directed in a direction perpendicularly intersecting the guide member 12, the space 21 is opened at one end of the holder 11 and the top end portion of the space 21 is blocked by a bottom wall 21A in the drawing.

A movable block 23 of a generally columnar shape is inserted through and held in the space 21 in a manner to be movable in a direction perpendicularly intersecting the longitudinal direction of the guide member 12, i.e. a direction perpendicularly intersecting the moving direction of the X-axis slider 5. On the other hand, an insertion hole 24 is formed in the central portion of the bottom wall 21A, a screw member 25 is inserted into and held in the space 21 through this insertion hole 24, and the forward end of this screw member 25 is threadably coupled into a threaded hole 26 provided in the center axis portion of the movable block 23. Furthermore, a keyway 27 is formed on a side surface of the movable block 23 in the moving direction thereof, and this keyway 27 forms a rotation locking mechanism 31 for the movable block 23 in cooperation with a key 28 projected from a side wall 21B of the space 21 into the keyway 27 and slidable in the keyway 28.

The forward end of the screw member 25 is threadably coupled into the threaded hole 26. Rotation of a finger grip 3 provided at the proximal end of the screw member 25 causes the movable block 23 locked in its rotation by the rotation locking mechanism 31 to move in the direction of the center axis of the space 21, i.e. a direction perpendicularly intersecting the guide member 12, namely, a direction perpendicularly intersecting the moving direction of the X-axis slider 5.

This movable block 23 is formed with a through-hole 41, which is disposed in a direction perpendicularly intersecting the moving direction of the movable block 23. The guide member 12 is movably coupled into and engaged with the through-hole 41. Furthermore, through-windows 42 are formed at positions corresponding to the hole 41 of the side wall 21B. The guide member 12 is also movably extended through these windows 42.

The threaded hole 26 is open to the hole 41, the forward end of the screw member 25 may protrude into the hole 41 from the opening of the threaded hole 26, and a side surface of the guide member 12 may come into contact with the protruded forward end of the screw member 25 from a direction perpendicularly intersecting the longitudinal direction of the guide member 12 (the axial direction of the guide member 12, or the moving direction of the X-axis slider 5). Here, the forward end portion of the screw member 25 is formed into a flat contact plane 25A disposed in a direction perpendicularly intersecting the axial line of the screw member 25.

The forward end of a screw body 51 may come into contact with the guide member 12 at a position opposed to the position where the screw member 25 is in contact with the guide member 12. This screw body 51 is disposed on the same axial line as the screw member 25, threadably coupled into and held by the movable block 23, the forward end portion of the screw body 51 is protruded into the through hole 41 for a predetermined length, and the protruded forward end portion is formed into a contact plane 51A disposed in parallel to the contact plane 25A, i.e. in a direction perpendicularly intersecting the moving direction of the movable block 23.

Depending upon the mounted posture of the movable block 23, it is preferable that a compression coil spring 55 for biasing the movable block 23 downwardly in FIG. 2 is provided in the space 21, and a stopper 56 is disposed downwardly of the movable block 23, so that the restoration of the movable block 23 to the initial position can be facilitated irrespective of the posture of the movable block 23.

Description will hereunder be given of action of this embodiment.

When the forward end (the contact plane 25A) of the screw member 25 is not protruded from the hole 41 (Refer to FIG. 2), the guide member 12 is freely movable in the hole 41. At this time, the X-axis slider 5 is supported in a manner to be movable relative to the X-axis rails 4. In this state, if the finger grip 32 of the clamp device 15 is rotated to press the contact plane 25A at the forward end of the screw member 25 against a side surface of the guide member 12 in the hole 41, then the movable block 23 rises relative to the screw member 25, due to this rise, the contact plane 51A at the forward end of the screw body 51 comes into pressing contact with the guide member 12 on the same axial line as the contact plane 25A and in a direction opposite to the guide member 12, whereby the X-axis slider 5 is fixed to the guide member 12. Upon completion of the abovedescribed process, the operation of the X-axis slider 5 is changed over to the fine adjustment. When the nut 13 for fine adjustment of the fine adjustment mechanism 16 is finely adjusted, the guide member 12 is finely adjusted in the axial line thereof (in the direction of the X-axis), whereby the X-axis slider 5 affixed to the guide member 12 is finely adjusted relative to the X-axis rails 4.

This embodiment with the above arrangement can offer the following advantages.

Such an arrangement is adopted that the guide member 12 is clamped at its opposite side surfaces by the two contact planes 25A and 51A to fix the holder 11 to the guide member 12, so that, even if the clamping force is intensified, there is no possibility of causing deflection to the guide member 12. For this reason, there is no possibility of giving even a very small deflection to the entire measuring instrument to cause an error in a value measured by the touch signal prove 7, so that this embodiment is advantageous in that the measurements with high accuracy can be carried out.

The both contact planes 25A and 51A are flat surfaces perpendicularly intersecting the moving directions of the movable block 23 and the screw member 25, respectively. Even if the guide member 12 is of a round rod-shape, the guide member 12 can be stably pressingly clamped from the opposite sides. For instance, even when the hole 41 and the guide member 12 are shifted in their center portions from each other, this embodiment is advantageous in that the guide member 12 can be clamped without a deflection given to the guide member 12.

Further, this arrangement is advantageous in that the construction is extremely simplified, easily rendered compact in size and the range of application thereof is wide.

FIG. 4 shows an embodiment in which the clamp device according to the present invention is applied to a height gauge.

Referring to the drawing, a slider 63 is vertically movably supported on a support 62 erected from a base 61, and a round rod-shaped guide member 64 is vertically movably supported in the neighborhood of and in parallel with the support 62 within a predetermined range therefrom. Furthermore, a fine adjustment screw 65 is coupled into and held by the base 61, and the bottom end portions of the fine adjustment screw 65 and the guide member 64 are brought into contact with opposite end portions of a lever 67 rotatably supported by the base 61 at a supporting point 66. When the fine adjustment screw 65 is rotated to move the screw 65 in the axial direction thereof, the rotation is adapted to transmitted to the guide member 64 through the lever 67. This guide member 64 is engaged therewith a clamp device 15 identical in construction with that of the preceding embodiment and this clamp device is affixed to the slider 63. In the clamp device 15 of this embodiment, a compression coil spring 68 is confined between the bottom wall 21A and the movable block 23, so that the looseness of the movable block 23 in the space 21 directed transversely is prevented through the resiliency of this compression coil spring 68. The guide member 64, the fine adjustment screw 65, the lever 67 and the clamp device 15 constitute a fine adjustment mechanism 71.

Even in the embodiment in which the present invention is applied to the height gauge as described above, it is possible to finely adjust the slider 63 relative to the support 62 by rotating the fine adjustment screw 65 to vertically move the guide member 64 after the slider 63 is clamped to the guide member 64. This embodiment is advantageous in that, when the holder 11 of the clamp device 15 is fixed to the guide member 64, a deflection due to the clamping force is not given to the guide member 64, whereby even a fine deflection is not given to the entire height gauge, so that measurements with high accuracy can be carried out.

Additionally, in working, the screw member 25 and the screw body 51 need not necessarily be disposed on one and the same axial line, and two screw bodies 51 may be opposed to one screw member 25, for example. Furthermore, those brought into pressing contact with the guide member 12 have been the contact planes 25A and 51A, however, the present invention need not necessarily be limited to this, and V-shaped planes, concave or convex spherical surfaces may be in contact with the guide member 12.

The contact plane 51A has been formed on the forward end of the screw body 51, however, the contact plane 51A may be formed integrally on the inner peripheral surface of the hole 41 at a predetermined position thereof. However, when the contact plane 51A is formed on the forward end portion of the screw body 51, the formation of the contact plane may be facilitated.

Moreover, the range of application of the present invention need not necessarily be limited to the coordinate measuring instrument and the height gauge as the measuring instruments, and the present invention is applicable to other various measuring instruments.

The present invention with the above arrangement can provide the clamp device in the measuring instrument capable of avoiding a deflection to a guide member even in clamping and of measuring with high accuracy.

We claim:

1. A clamp device in a measuring instrument for clamping a slider movably engaged with an elongated guide member to said guide member, comprising:
   a holder afixed to said slider and penetrated therethrough with said guide member, said holder having an elongated vacant space therein, the longitudinal axis of which extends perpendicularly intersecting said guide member;
   a movable block received in said vacant space in a manner to be reciprocally movable in the longitudinal direction of said space, said block having a through-hole therein through which said guide member extends, said movable block having threaded holes therein extending into said through hole from portions of opposing surfaces on said movable block in the moving direction thereof, a screw member having a flat contact surface thereon received in one of said threaded holes and adapted to contact said guide member on one side thereof, a screw body having a contact plane at the forward end thereof received in the other of said threaded holes and adapted to contact said guide member on a side thereof opposite to said one side;
   a finger grip, for controlling said screw member, provided on a proximal end portion of said screw member extending to the exterior of said holder;
   a spring provided in said holder, for biasing said movable block toward said guide member; and
   a rotation locking mechanism for preventing said movable block from rotating in said holder during rotation of said screw member, said rotation locking mechanism including a keyway formed on said movable block and a key projecting from said holder into said keyway;
   a rotation of said screw member effecting a relative axial movement between said screw member and said block to bring one of said flat plane and said contact plane into contact with said guide member, a continued rotation of said screw member eventually bringing the other of said flat plane and said contact plane into contact with said guide member, said flat plane and said contact plane both contacting said guide member equally from opposite sides thereof to lock said holder to said guide member and to thereby prevent a deflection of said guide member when said holder is locked to said guide member.

2. A clamp device in a measuring instrument as set forth in claim 1, wherein a stopper for limiting movement of said movable block in one direction is provided on a portion of said holder.

3. A clamp device as set forth in claim 1, wherein said slider has a detecting portion and is supported on a guide rail of a coordinate measuring instrument, and wherein said guide member extends parallel to said guide rail and includes means for facilitating a finally controlled movement of said slider.

* * * * *